(12) United States Patent
Tamminen

(10) Patent No.: US 8,926,799 B2
(45) Date of Patent: *Jan. 6, 2015

(54) FEED SECTION OF A SEPARATION COLUMN

(75) Inventor: Esa Tamminen, Porvoo (FI)

(73) Assignee: Neste Oil Oyj, Espoo (FI)

( * ) Notice: Subject to any disclaimer, the term of this patent is extended or adjusted under 35 U.S.C. 154(b) by 577 days.

This patent is subject to a terminal disclaimer.

(21) Appl. No.: 13/169,155

(22) Filed: Jun. 27, 2011

(65) Prior Publication Data

US 2011/0308931 A1   Dec. 22, 2011

Related U.S. Application Data

(63) Continuation-in-part of application No. 13/162,601, filed on Jun. 17, 2011.

(60) Provisional application No. 61/356,668, filed on Jun. 21, 2010.

(30) Foreign Application Priority Data

Jun. 21, 2010 (EP) .................................. 10166662
Jun. 27, 2011 (EP) .................................. 11171454

(51) Int. Cl.
*B01D 3/14* (2006.01)
*B01D 1/06* (2006.01)
*B01D 19/00* (2006.01)
*B01D 3/00* (2006.01)
*B01D 3/32* (2006.01)
*B01D 3/06* (2006.01)

(52) U.S. Cl.
CPC ............... *B01D 1/06* (2013.01); *B01D 19/0063* (2013.01); *B01D 3/008* (2013.01); *B01D 3/32* (2013.01); *B01D 19/0094* (2013.01); *B01D 19/0036* (2013.01); *B01D 3/14* (2013.01); *B01D 3/06* (2013.01)
USPC ........... 202/158; 202/262; 196/100; 196/135; 261/19; 261/78.2; 261/114.5; 261/115; 95/193; 95/200

(58) Field of Classification Search
CPC ............ B01D 3/008; B01D 3/06; B01D 3/14; B01D 3/32; B01D 19/0036; B01D 19/0063; B01D 19/0094
USPC ............. 202/158, 262; 203/88; 196/100, 135; 208/352, 361; 261/19, 78.2, 114.5, 261/115; 95/193, 200
See application file for complete search history.

(56) References Cited

U.S. PATENT DOCUMENTS 3,057,786 A * 10/1962 Waddill .......................... 203/20
4,264,538 A * 4/1981 Moore et al. ................... 261/97

(Continued)

FOREIGN PATENT DOCUMENTS

| JP | 52042428 U | 4/1977 |
| WO | WO9730780 A1 | 8/1997 |
| WO | WO2008104900 A2 | 9/2008 |

*Primary Examiner* — Nina Bhat
*Assistant Examiner* — Jonathan Miller
(74) *Attorney, Agent, or Firm* — Seppo Laine Oy; Joshua P. Wert

(57) ABSTRACT

A feed distribution device in separation columns and a method of operation for such a device. In particular, distillation columns in which the feed stream is substantially liquid phase, or a mixture of gas and liquid upstream of the column, but where the feed vaporizes or partially vaporizes prior to or as it enters the column. More specifically, the feed distribution device contains a plurality of opening which allow the feed to vaporize prior to or as it enters the column and where the openings are maintained in critical condition during operation. Significant advantage is achieved through the implementation and use of the present feed distribution devices.

18 Claims, 7 Drawing Sheets

(56) References Cited

U.S. PATENT DOCUMENTS

| | | | |
|---|---|---|---|
| 4,290,980 A * | 9/1981 | Pikon et al. | 261/94 |
| 4,816,191 A * | 3/1989 | Berven et al. | 261/97 |
| 5,037,616 A * | 8/1991 | Williatte et al. | 422/140 |
| 5,346,133 A * | 9/1994 | Bogner et al. | 239/132.3 |
| 6,007,604 A * | 12/1999 | Risse | 95/13 |
| 6,058,623 A * | 5/2000 | Brooks et al. | 34/362 |
| 6,068,730 A * | 5/2000 | Ramm-Schmidt et al. | 159/43.1 |
| 6,341,765 B1 | 1/2002 | Moser | |

\* cited by examiner

A-A

FEED SECTION OF A SEPARATION COLUMN

The present application is a continuation-in-part of U.S. non-provisional application Ser. No. 13/162,601 filed Jun. 17, 2011 which is a non-provisional application of U.S. provisional application 61/356,668 filed Jun. 21, 2010. U.S. application Ser. No. 13/162,601 and No. 61/356,668 are herein incorporated by reference.

FIELD OF INVENTION

The present invention generally relates to separation columns. In particular it relates to distillation columns in which the feed stream is liquid phase, or a mixture of gas and liquid upstream of the column, but where the feed vaporizes or vaporizes more before it enters the column. Such columns contain a section of the column into which a feed flow is directed from one or more inlets. There is a need in the field to improve the introduction of the feed stream to such columns and to improve the feed distribution into such sections.

GENERAL DESCRIPTION OF THE ART

Flashing is a common phenomenon in distillation columns where at least a portion of a feed stream changes phases when reduced to the prevailing pressure of the column. The resultant feed stream entering the column is then a gas/liquid mixture. Based on processing requirements it has proven difficult in application to efficiently and effectively introduce such a feed to a column.

When there is an upper separation section, at least one section above the feed input location, a standard requirement is that the gas portion of the feed stream should be distributed uniformly to the upper separation section. A related requirement is that there should ideally be no local velocity peaks of the gas flow. When there is a lower separation section, at least one section below the feed input location, a standard requirement is that any liquid portion of the feed stream should be collected and directed to the lower separation section. The lower separation section may contain a specific location such as an inlet to a liquid distributor.

One industry practice is to avoid large amounts of flashing inside columns by reducing the pressure of feed streams with a device upstream of the column which reduces the pressure of the feed stream to that desired in the column itself. The feed stream exiting the upstream device and traveling to the column, normally via a pipe, is a gas/liquid mixture having a significant fraction of gas. The large amount of gas means that either the pipe has to have a relatively large diameter in order to keep the flow velocity of the gas/liquid mixture low inside the pipe, or in the case that the diameter of the pipe is small the resulting flow has an undesirably high velocity inside the pipe.

Having a large pipe is undesirable because it requires a greater height of the feed stream section of the column. This increases the overall height necessary for the column which adversely impacts design cost, building cost, operation costs and maintenance costs. The routing of large pipe is also more difficult, takes up greater amounts of space and is more expensive. The drawback to having small pipes is the increased risk of erosion problems due to high flow velocity and other characteristics of the gas/liquid mixture.

Often, the upstream device is a flow control means in the form of a control valve. The control valve facilitates the major part of the pressure reduction. The significant fraction of gas produced by this pressure reduction step imposes additional problems in the design and sizing of such valves. This is due to the outlet conditions being very different from the inlet conditions. Due to the two phase flow (gas/liquid mixture) the location of the valve upstream of the column as well as the piping downstream of the valve must be designed with care in order to avoid the problems created by flow instability and erosion.

Examples and discussion of current industry practice can be found in Distillation Operation by H. Kister, (book published by McGraw-Hill, ISBN 0-07-034910-X) with FIG. 2.2j specifically, which explains using a tangential entry to the column in order to satisfy the processing requirements described above.

Packed Tower Design and Applications by R. F. Strigle Jr, (book published by Gulf Publishing Co in 1994 [2nd Ed.], ISBN 0-88415-179-4) gives some examples in FIGS. 10-15 and 10-16 for feed streams that produce gas/liquid mixtures when pressure of the feed stream is reduced to that of the column. One example utilizes a chamber where the flashing takes place. In a second example, a circular channel along the walls of the column has been provided and the feed is directed above and into that channel. Both examples are being applied to columns with small diameter.

Some specific examples where the above described conditions concerning flashing feed streams are particularly prevalent are in oil refineries and petrochemical plants; particularly in atmospheric and pressure distillation columns, and specifically in the vacuum distillation columns. A specific location in some vacuum distillation columns is the reboiler return to the column, where the gas/liquid mixture is introduced to the column from a reboiler, where the reboiler serves as vaporization means.

One of ordinary skill in the art will recognize that the above described conditions and associated problems are present to at least some degree in all contacting devices where a flashing feed is present in the system.

SUMMARY OF THE INVENTION

An object of the present invention is to facilitate the introduction and distribution of a flashing feed stream to a contacting device column.

It is an object to provide a feed distribution device which substantially enables the flashing of the feed stream at one or more desired locations within the feed distribution device.

In several embodiments of the present invention, the desired flashing location(s) are within the feed distribution device and outside of the outer wall of the contacting device column. In certain embodiments, this is accomplished in part by maintaining the pressure of the feed stream at a high enough pressure until said location(s). Maintaining of the pressure is achieved in certain embodiments by arranging openings with sufficient pressure drop inside the feed distribution device in which flashing or vaporization takes place. More specifically, the flashing of the feed stream substantially occurs when the stream flows through the openings and the flow through the openings is in choked (or critical) conditions.

Additionally, it is an object of certain embodiments of the present invention to provide a feed distribution device which can be used to distribute the gas produced by flashing of the feed more evenly along the cross-sectional area of a separation section above the feed location compared to the distribution with no or other feed distribution devices.

An additional object of certain embodiments of the present invention is, alone or in conjunction with distributing the feed more evenly, to use the feed distribution device to reduce the maximum magnitude of local velocity of at least a portion of the gas flashed from the feed as it is introduced to a separation section above the feed location.

A further object of certain embodiments of the present invention is to facilitate ideal mixing of the gas produced by flashing of a feed uniformly with gas coming from a separation section below the feed inlet section.

DETAILED DESCRIPTION OF EXEMPARY EMBODIMENTS

There are numerous types and variations of contacting device columns. Some of the standard contacting device columns are distillation columns, stripping columns and absorption columns. In addition to columns with a single purpose, some contacting columns are combinations of two or more standard processes (i.e. distillation and absorption). Further, there are categories such as packed columns and tray columns. One of ordinary skill in the art will recognize the applicability for the present invention in all of the types and variations of contacting devices enumerated above in addition to those not specifically enumerated but art recognized, where such flashing feed conditions have at least the potential to exist.

Figure 1:
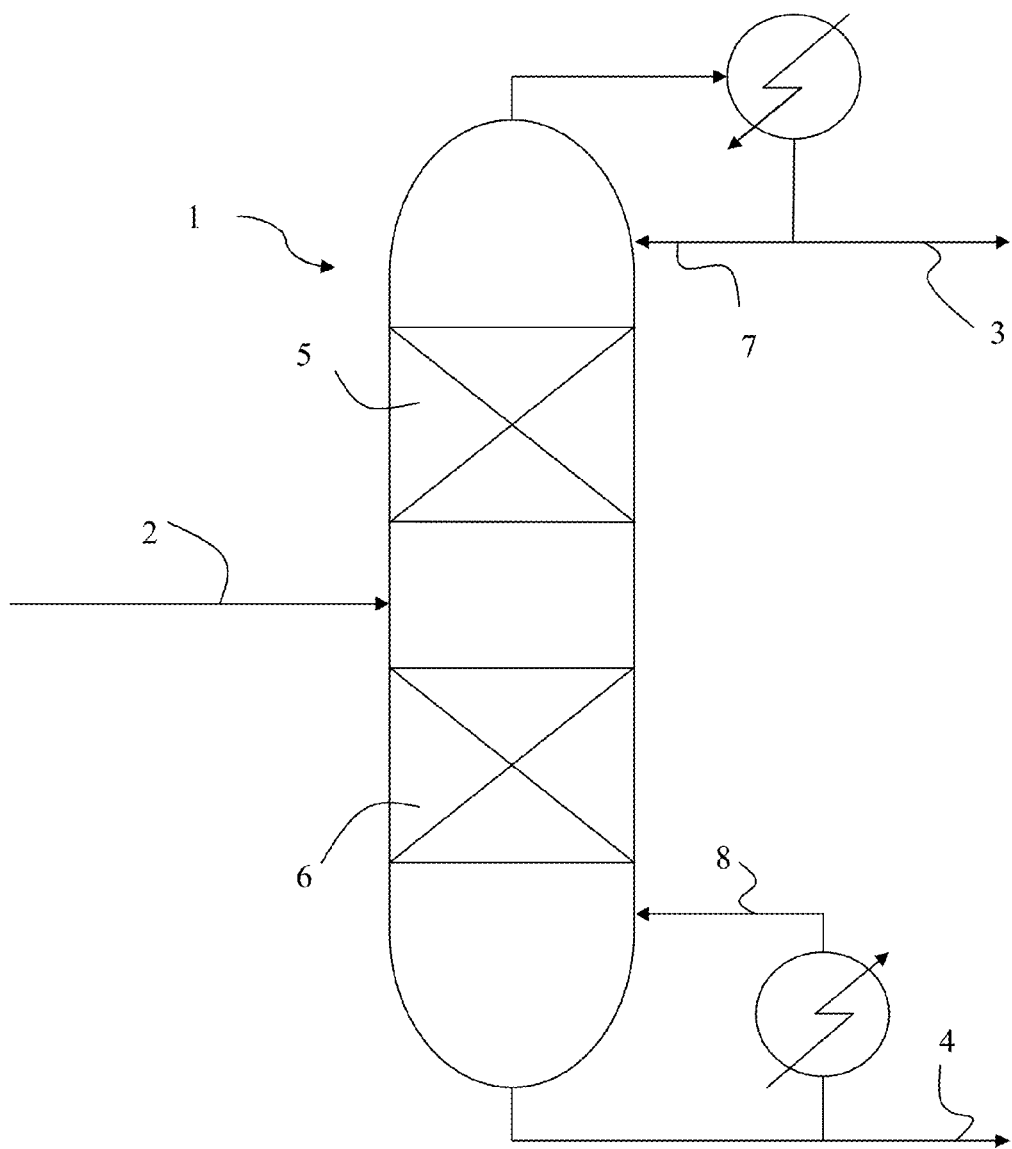
FIG. 1 is a schematic of a distillation column.

FIG. 1 shows a contacting device column 1 as a vacuum distillation column with one main feed inlet 2 and two outlets 3 and 4. One outlet is provided for each product to be separated from the feed by the separation sections, 5 provided above and 6 provided below the main feed inlet location. In addition to the main feed 2, there is a return feed inlet 7, reflux, located above the main feed inlet and a feed inlet 8, reboiler return, located in the lower section of the column. For simplicity, the system producing the vacuum has been omitted.

Figure 2A:
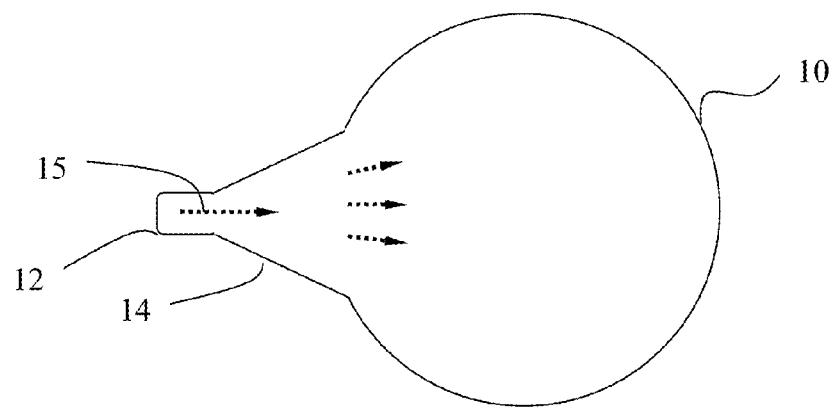
FIG. 2A is a top-down view of a section of a column with an open conical feed distribution device.
Figure 2B:
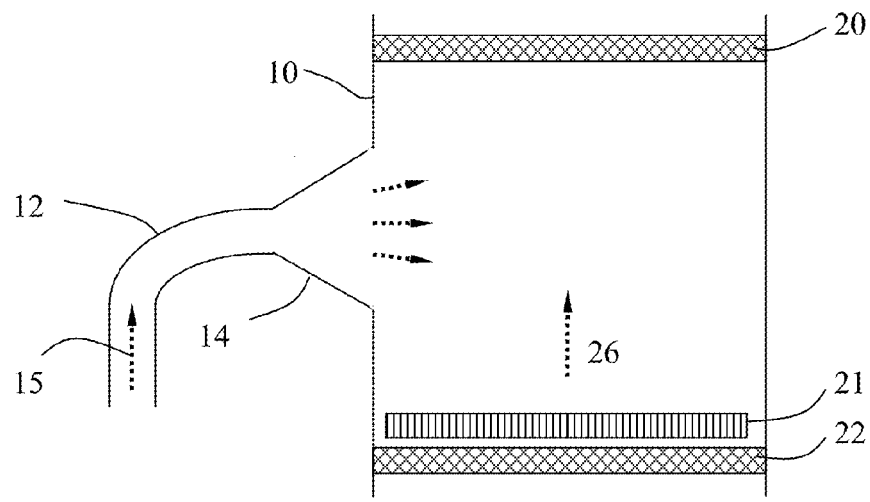
FIG. 2B is a side-view representation of the section in FIG. 2A.

A feed inlet section is presented in more detail in FIGS. 2A and 2B. FIG. 2A shows the sidewall of a contacting device column 10 which encloses the interior portion of the contacting device column. Affixed to the outside of column 10 is a feed distribution device 14. The feed distribution device is fed by feed 15 from line 12.

The feed distribution device is formed such that the feed stream flow at some point within the feed distribution device, and before entry in to the column, is in critical (choked) condition. As the pressure of the feed reduces, which is due for example in at least part to both flow friction and reduced height of the fluid column in line 12, the feed flow vaporizes significantly. Feed distribution device 14 has a cross-sectional area selected to allow the passage of the formed two phase mixture. The cross-sectional area is relatively small and therefore causes the flow to choke. This choking sets a maximum flow rate that can be achieved through the feed distribution device.

Figure 4:
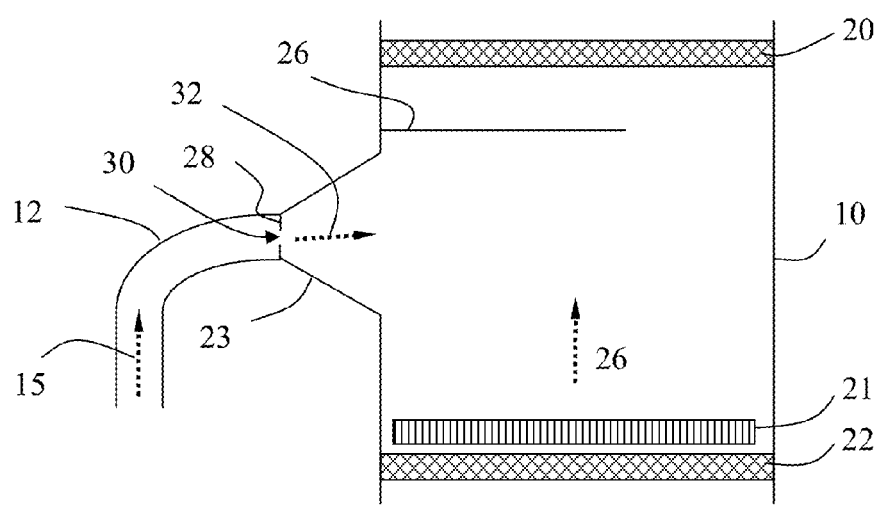
FIG. 4 is a side-view representation of a section having a conical feed distribution device.
Figure 5:
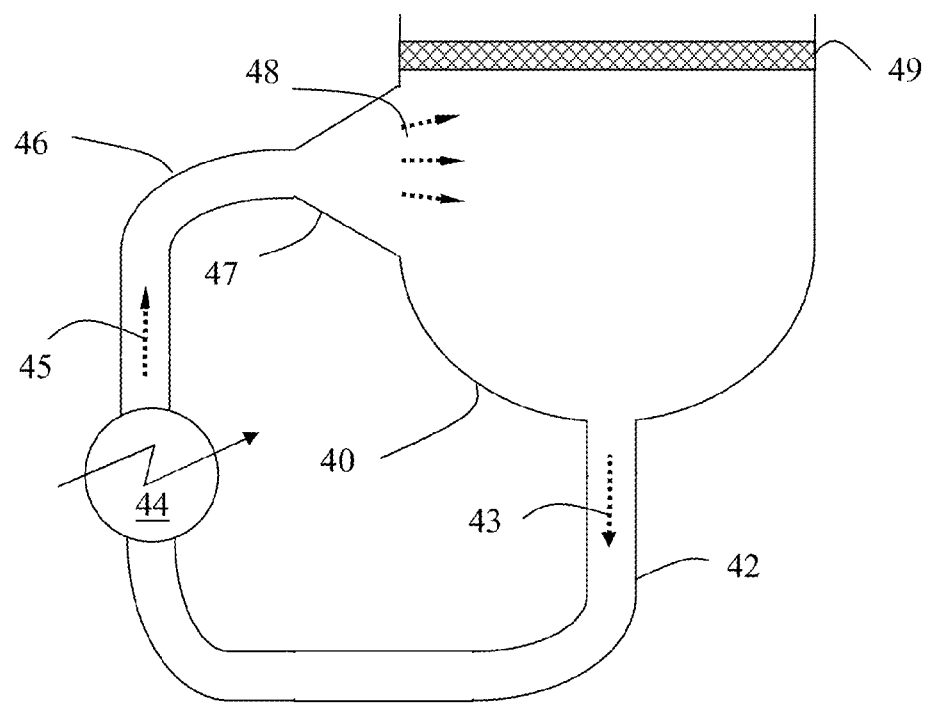
FIG. 5 is a side-view representation of a lower section of a column having an open conical feed distribution device.

In practice, feed 15 flows through line 12 at a mass flow rate and at a first pressure during normal operation. The contacting column is kept at a second pressure which is lower than the first. When the feed exits the feed distribution device, based on the pressure differential the liquid portion of the feed will expand, vaporize and the feed will enter the column from each of any openings (a single opening is shown in FIGS. 2, 4 and 5 while multiple openings are shown in 3 and 6) and the feed flow at some point inside the feed distribution device 14 will be in critical (choked) conditions.

Based on the mass flow rate in the feed inlet, there is a point where the differential between the first pressure and the second pressure in the column no longer affects the amount of feed entering the contacting column. This is due to the fact that no more feed can possibly pass through the feed distribution device 14 due to the choking phenomenon. The point where lowering the second pressure does not have an effect on the amount of feed entering the column through the feed distribution device is defined as the critical point. For all second pressures from the critical point to all pressures below the critical point, the flow through the feed distribution device 14 is considered to be in critical or choked condition.

Therefore, the total cross-sectional area of the feed distribution device, should be such that critical condition is achieved for the flow through the device. The total cross-sectional area will vary from one installation to another and the area is chosen to specifically work with the operating conditions, e.g. the operational mass flow rate, operating temperature range, operating pressure range, flow composition, etc. in each installation. The selection of the total cross-sectional area can be chosen through standard calculations or with the aid of tools such as Computational Fluid Dynamics software.

When the feed flow is in critical (choked) condition the only means for increasing the maximum flow rate is to increase the total cross-sectional area or increase the first pressure.

Feed stream 15 enters the feed distribution device 14 outside of the wall 10 of the contacting column. In the present example of FIGS. 2A and 2B, the feed distribution device 14 has a generally conical or trapezoidal shape. The feed distribution device 14 contains an expansion chamber between the feed line 12 and the column 10. The expansion chamber has a cross-sectional area which is larger than that of the feed line 12. Though the shape is generally shown as conical/trapezoidal, one of ordinary skill in the art will recognize a variety of both regular and irregular shapes which do not depart from the scope of the present invention.

The feed distribution device may be used in conjunction with a chimney tray and/or another device or devices known to a person skilled in the art which are used in contacting columns. Such known devices can be a ring channel, several suitably located flash boxes, or other geometries which enable the gas 26 coming from the separation section below to pass through the feed section and/or collecting the liquid resulting from the feed distribution device and/or from the separation section above (if such section exists).

While the present example shows a single feed distribution device 14 connected to a single feed line 12 for introducing feed to the column, there may be one or more additional feed distribution device and line assemblies introducing one or more additional feeds in to a section of a column. Additionally, a single feed distribution device can be fed by more than one feed line.

The size and number of the openings of the feed distribution device, along with the size and shape of the expansion chamber can be selected in such a way that the feed inside the feed distribution device 14 is maintained substantially in liquid phase until the feed reaches the point significant vaporization takes place. Said characteristics of the feed distribution device can also be designed and chosen so that the feed to the distribution device 14 can have a fraction of gas/vapor.

In order to minimize operation and maintenance cost, it is desirable to maintain flow that is substantially liquid in the feed line 12. The conditions to maintain that flow substantially in liquid phase are based at least in part, for example, on the feed itself as well as any processes that have taken place upstream of the contacting column Selecting the proper dimensions and placement of the total cross-sectional area of feed distribution device 14 allows the vaporization of the feed to take place in the desired location within the device and prior the contacting column section.

FIGS. 2A and 2B show an embodiment of a feed distribution device in a central portion of a contacting column. In FIG. 2B, there is shown below the feed distribution device 14 a lower separation section with a liquid distributor 21 and a separation means 22, e.g. packed bed. The lower separation section is show emitting a gas stream 26. When the feed inlet to a contacting column is located as shown, an addition of a chimney tray and chimneys (not shown) can be advantageous. The gas stream 26 will flow through the chimneys and eventually to the upper separation section. Above the feed inlet section there is shown an upper separation section with separation means 20, e.g. packed bed.

Figure 3A:
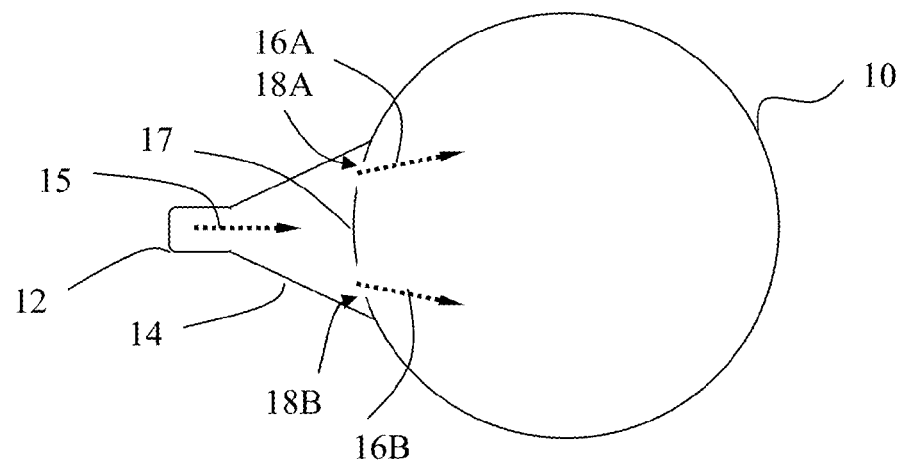
FIG. 3A is a top-down view of a section of a column with a partitioned conical feed distribution device.
Figure 3B:
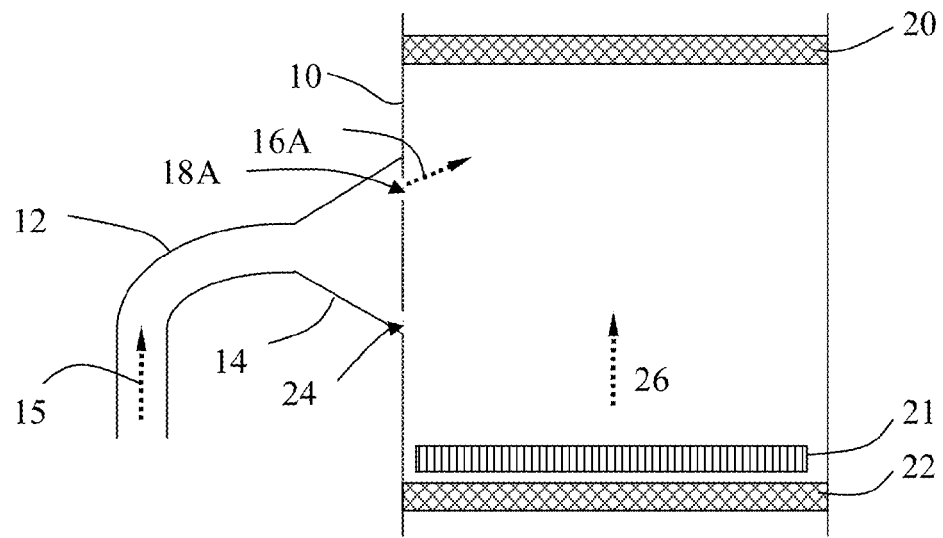
FIG. 3B is a side-view representation of the section in FIG. 3B.

A feed inlet section according to an embodiment of the present invention is presented in more detail in FIGS. 3A and 3B. FIG. 3A shows the sidewall of a contacting device column 10 which encloses the interior portion of the contacting device column. Affixed to the outside of column 10 is a feed distribution device 14 which has a plurality of openings 18A, 18B and 24 (shown). The feed distribution device is fed feed 15 by line 12.

A key feature of the feed distribution device is that the feed stream flow through holes, e.g. 16A and 16B, in to the column is in critical (choked) condition. The flow chokes at the holes 18A, 18B and 24 and this choking sets maximum flow rate that can be achieved through the holes.

Feed 15 flows through line 12 at a mass flow rate and at a first pressure. The contacting column is kept at a second pressure which is lower than the first. When the feed exits the feed distribution device, based on the pressure differential the liquid portion of the feed will expand, vaporize and the feed will enter the column from each opening and the feed flow through the holes will be in critical (choked) conditions.

Based on the mass flow rate in the feed inlet, there is a point where the differential between the first pressure and the second pressure in the column no longer affects the amount of feed entering the contacting column. This is because no more feed can possible exit the feed flow path device openings due to the choking phenomenon. The point where lowering the second pressure does not have an effect on the amount of feed entering the column through the holes is defined as the critical point. For all second pressures from the critical point to all pressures below the critical point, the flow through the holes is considered to be in critical or choked condition. Therefore, the size of each opening of the feed distribution device to the column, and the total area of the openings of the feed distribution device, must be such that critical conditions are achieved for the flow through the holes. These sizes will vary from one installation to another and the sizes are chosen to specifically work with the operating conditions in each installation. The selection of the size of each opening, the total number of openings and the overall opening area can be chosen through standard calculations or with the aid of tools such as Computational Fluid Dynamics software.

When the feed flow is in critical (choked) condition the only means for increasing the maximum flow rate is to increase the total hole area or increase the first pressure.

Feed stream 15 enters the feed distribution device 14 outside of the wall 10 of the contacting column. In the present example of FIGS. 3A and 3B, the feed distribution device 14 has a generally conical or trapezoidal shape. The feed distribution device 14 contains an expansion chamber between the feed line 15 and the column 10. The expansion chamber has a cross-sectional area which is larger than that of the feed line 12. The partition 17 between the expansion chamber and the interior of the column can be a portion of the column wall 10 and/or it can be an integral portion of the feed distribution device 14.

In the present example, partition 17 comprises a plurality of openings. As shown in the drawings there are two openings 18A and 18B towards the top of the feed distribution device 14. Additionally, there is shown an opening 24 at the bottom of the feed distribution device 14. The number of openings, their individual sizes and locations can vary on the partition 17 based on the specific operating conditions of a column. One or more openings towards the bottom of the feed distribution device, e.g. 24, can allow any liquid accumulated to the bottom of the chamber to exit the expansion chamber. However, dimensions of the openings should be such that the feed flow, e.g. 16A and 16B and 24, through the openings is in choked condition.

The feed distribution device may be used in conjunction with a chimney tray or alternatively, other devices known to a person skilled in the art can be used. Such known devices can be a ring channel, several suitably located flash boxes, or other geometries which enable the gas 26 coming from the separation section below to pass through the feed section and collecting the liquid resulting from the feed distribution device and from the separation section above (if such section exists).

While the present example shows a single feed distribution device 14 connected to a single feed line 12 for introducing feed to the column, there can be one or more additional feed distribution device and line assemblies introducing one or more additional feeds in to a section of a column. Additionally, a single feed distribution device can be fed by more than one feed line.

The size and number of the openings of the feed distribution device, along with the size and shape of the expansion chamber can be selected in such a way that the feed inside the feed distribution device 14 is maintained substantially in liquid phase until the feed enters the column section. Said characteristics of the feed distribution device can also be designed and chosen so that the feed inside the expansion chamber can have a fraction of gas/vapor. The inlet stream as it flows through the openings into the feed inlet section of the column then vaporizes or vaporizes more and is simultaneously in choked conditions.

The openings in the partition 17 can be holes cut out of the wall 10 of the column, holes cut out of the partition 17 or nozzles attached to column wall, partition material and/or feed distribution device. In the instance that they are holes cut out of the surface of the wall of the column or other partition material, they can be cut by any well know means such as a plasma cutter, mechanical cutter, mechanical stamp or laser. In the instance that the holes are nozzles, the nozzles can be of simple or complex design and can be manufactured integrally with the feed distribution device, partition or column wall. Alternatively, the nozzles can be permanently or removably attached/coupled to the feed distribution device, partition or column wall. Examples of means for attaching the nozzles are welding, adhering or providing threaded openings in the support surface along with corresponding threads on the nozzles.

The size, type and placement of openings are chosen based on the feed input characteristics, environmental characteristics inside the contacting column inlet section, desired feed distribution or combination thereof. In order to minimize operation and maintenance cost, it is desirable to maintain flow that is substantially liquid in the feed line 12. The conditions to maintain that flow substantially in liquid phase are based on the feed itself as well as any processes that have taken place upstream of the contacting column. Selecting the proper dimension and placement of the openings along with the dimensions of the expansion chamber allows for the vaporization of the feed in the desired locations with respect to the contacting column section.

FIGS. 3A and 3B show a specific implementation of a feed distribution device in a central portion of a contacting column. In FIG. 3B, there is shown below the feed distribution device 14 a lower separation section with a liquid distributor 21 and a separation means 22, i.e. packed bed. This lower separation section emits gas stream 26. When the feed inlet to a contacting column is located as shown, then the addition of a chimney tray and chimneys (not shown) can be advantageous. Gas stream 26 would flow through the chimneys and eventually to the upper separation section. Above the feed inlet section there is an upper separation section with separation means 20, e.g. packed bed.

FIG. 4 shows another example of a feed distribution device 23. The feed distribution device 23 connects a feed line 12 having a feed flow 15 preferably in a liquid phase to the column section similar to FIGS. 3A and 3B. However, the expansion chamber of the feed distribution device 23 opens directly to the column interior, i.e. there is no or virtually no division between the feed distribution device and the column interior as described with respect to the feed distribution device 23.

Feed distribution device 23 has a partition 28 between at a point between the feed line 12 and the column interior. In the figure, the location of partition 28 is shown at the junction of the expansion chamber and the feed line 12. However, the partition 28 can be located slightly within the feed line 12 or at another location within the expansion chamber of the feed distribution device 23 prior to the column wall 10. Partition 28 can have one or more openings 30 which allow feed 32 to vaporize, or vaporize more, and enter the column section.

The one or more openings 30 are similar to those described with respect to the example of FIGS. 3A and 3B. The dimensions and location of said openings and the partition location are chosen so that the feed 32 entering the expansion chamber of the feed distribution device 23 is in critical (choked) condition.

FIG. 4 also shows a plate 26 which is illustrative of a means for more evenly distributing the vaporized feed flow 32 once inside the column section. The plate can be solid, slatted, patterned, grated or otherwise formed/shaped so as to cause the vaporized feed flow 32 to evenly, or more evenly be distributed along the upper separation section 20.

In certain embodiments, there is a flow loop in which a stream is taken from the column, the stream is heated and then the stream is reintroduced to the column. An example of a section where the stream is reintroduced is shown in FIG. 5. Any reintroduced stream can also be considered a feed. The stream taken out from a column is often in its bubble point, meaning that virtually any additional heat will cause vaporization (flashing) to take place when the stream is reintroduced to the column.

FIG. 5 shows the sidewall 40 of a contacting device column which encloses the interior portion of the contacting device column. The column section has a feed line 46. The feed stream 45 is a reintroduced feed to the column after it has been heated in a loop described previously or, for example, a reboiler 44. As shown in the figure, a liquid feed 43 is taken from the bottom of the contacting column through a line 42. The line then takes the feed to the reboiler 44 which heats and sends the feed 45 through line 46 towards the column. The feed distribution device 47 has a chamber similar to that described with respect to the feed distribution device 14 of FIGS. 2A and 2B and reintroduces the vaporized feed 48. However, the feed distribution device can be in accordance with any of the embodiments of the present invention. Above the feed inlet is shown a separation means 49, e.g. packed bed.

Figure 6A:
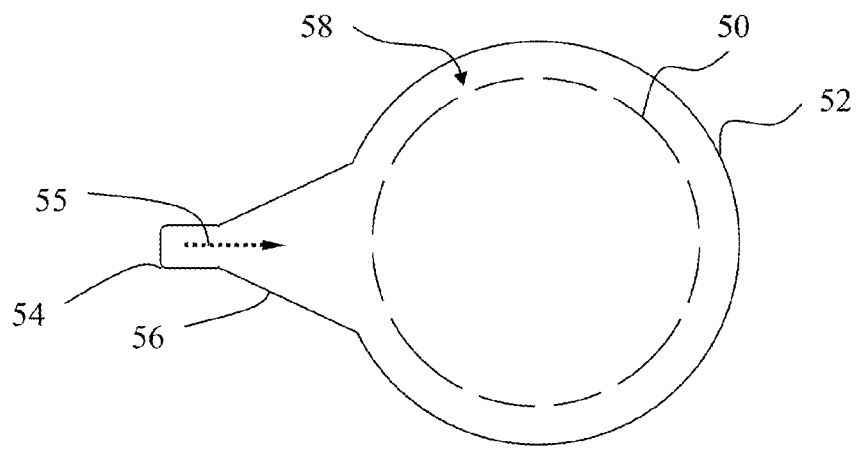
FIG. 6A is a top-down view of a section of a column having an outer wall 50 and an embodiment of a feed distribution device having a tire shaped chamber 52 which encircles the outer wall of the column.

FIG. 6A shows an embodiment of the present invention which has a feed distribution device 56 which has an expansion chamber similar to that of the embodiments of FIGS. 2 and 3 with a feed inlet 54 and feed flow 55. However, the feed distribution device further comprises a tire like chamber 52 which encircles the circumference of the outer wall 50 of the contacting column. Between the tire like chamber 52 and the interior portion of the column are arranged a series of openings 58. The openings function in a similar manner as the openings described with regards to the FIGS. 3A and 3B.

Figure 6B:
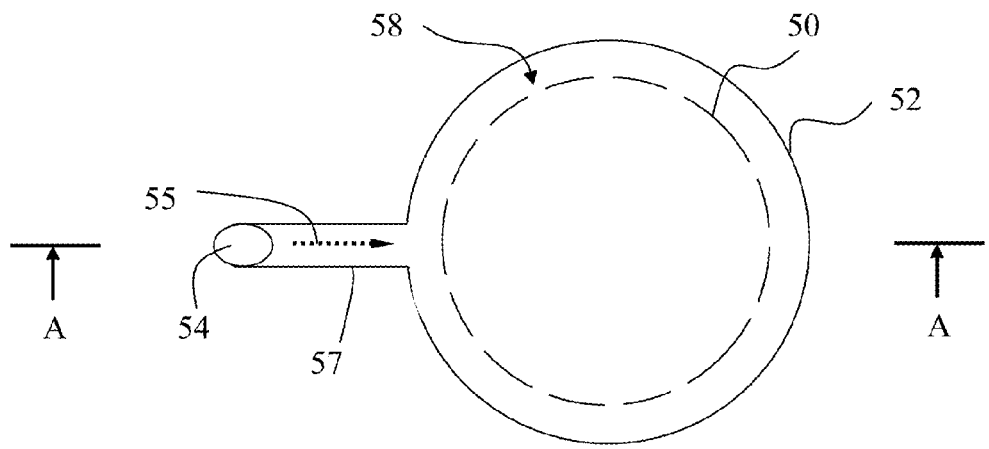
FIG. 6B is a top-down view of a section of a column having an outer wall 50 and an embodiment of a feed distribution device having a tire shaped chamber 52 which encircles the outer wall of the column.

FIG. 6B shows an embodiment similar to that of 6A with a pipe-like connection 57 between the feed inlet 54 and the tire like chamber 52. The pipe-like connection may be a continuation of the feed inlet 54 or it may be a cylindrical chamber, or cylindrical-like chamber portion of the same, similar or different diameter as the tire-like chamber 52.

The openings 58 as shown in both FIGS. 6A and 6B can be openings cut through the outer wall 50 of the contacting column. The openings may also be nozzles or other means for allowing the feed to pass from chamber 52 in to the interior portion of the contacting column while vaporizing, or vaporizing more, and while being in choked condition. An example according to FIG. 6A allows for some amount of vaporization to occur in the chamber 56 before the feed enters in to the contacting column through the openings 58. In an example according to FIG. 6B the majority of the vaporization happens as the feed enters the interior of the contacting column through the openings 58. In either case, the flow through the openings 58 is in choked, or critical condition.

Figure 6C:
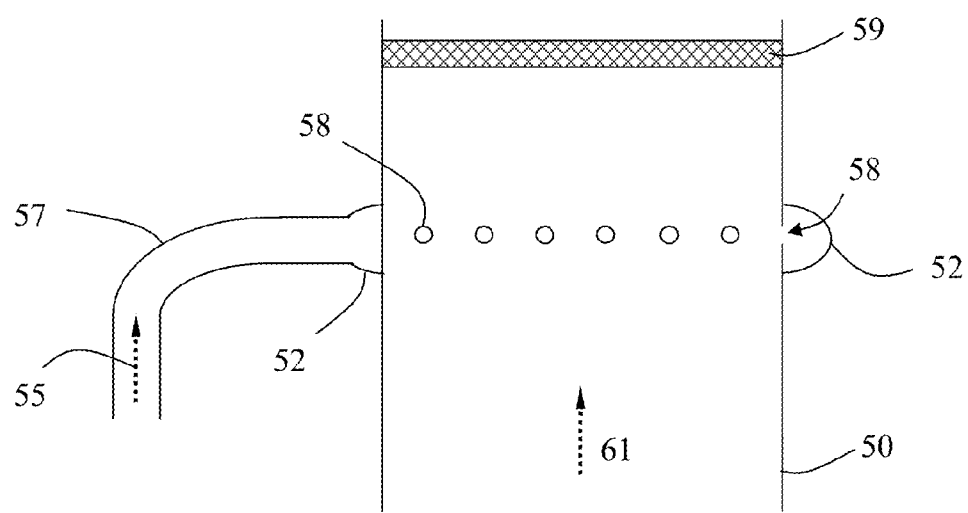
FIG. 6C is a side-view representation of a cutaway A-A of the column and feed distribution device of FIG. 6B.

FIG. 6C shows a cutaway view of the section shown in FIG. 6B. From the cutaway the openings 58 are shown as round openings cut through the outer wall 50 of the contacting column. The chamber of the tire like chamber is visible along the left and right sides of the column. An opening 58 is shown directly opposite the feed inlet. Additionally, as can be seen in FIGS. 6B and 6C, there is no direct path for the feed to flow from the feed inlet in to the column Therefore, the column wall acts as a partition and the feed is deflected around and through the chamber 52.

In the examples, the cross-sectional area of each opening and the total cross-sectional area of all openings is selected so that the flow through all of the openings is in choked condition. The cross-sectional area of each of the openings can be identical or similar. Additionally, the cross-sectional area of the openings can vary around the circumference of the column wall.

Furthermore, although chamber 52 is shown completely encircling the circumference of the column, the chamber can stop short of a full 360 degrees, i.e. the feed distribution device may encircle only a portion of the circumference of the column section. Additionally, the shape and/or dimensions of the chamber may be constant or may vary along the circumference that the feed distribution device encircles. Numerous variations of chamber size, shape and even orientation, e.g. the back of a tire like chamber may be raised or lowered vertically compared to the front with the feed inlet, may be implemented without departing from the scope of the present invention.

As discussed with regards to the earlier figures, there is shown in FIG. 6C a feed flow 61 coming from a lower portion of the column and a separation section 59 above the feed distribution device openings. One or more devices may be utilized within and around the section of the contacting column having the feed inlet to facilitate the even and/or homogeneous mixture of the introduced feed flow and flow 61 and/or the even distribution of feed along the surface of the separation section 59.

Embodiments such as, and similar to, that of FIGS. 6A-C are particularly well suited for columns having relatively small diameters, for example, columns having a diameter in the order of one meter. However, each embodiment is illustrated to show an example of placement on a column but should not be limited to that particular placement, or type of column.

With regards to the previous embodiments, the majority of the vaporization occurs in the disclosed chambers and/or openings. However, within the bend in the feed inlet shown in FIGS. 2B, 3B, 4, 5 and 6C there is often a minor, and occasionally a sizable, amount of vaporization. This bend can be a portion of the feed inlet pipe as primarily disclosed herein or it may be a portion of the feed distribution device so that the feed inlet pipe connects to the feed distribution device in a substantially vertical, and non-bent, orientation.

The placement of a feed distribution device which enables the flashing of the feed to take place at desired locations inside the feed inlet section or in the feed distribution device allows for contacting device columns to operate more efficiently. Additionally, while several examples and embodiments have been described with respect to specific locations on and in a contacting column, each can be employed at various other locations as described with respect to other examples or in additional locations. More than one feed distribution device can be used on any given column section and need not be identical to any other feed distribution device being used in the section.

Additionally, designing a feed distribution device in accordance with the present invention allows the feed in the feed line to be maintained in a liquid or substantially liquid phase in the feed line prior to the contacting column section. This reduces the complexity of the distillation system as well as the harmful effects of gas phase, or high percentage gas phase, flows in the pipes and inlets leading to the contacting column. However, it will be recognized to those of ordinary skill in the art that the present device can also be utilized when the feed has more vapor in it but without obtaining all of the advantages of reducing harmful effects of the feed as when the feed is substantially liquid. One of ordinary skill in the art will also recognize additional advantages to the present invention and various geometries of feed flow path devices, chimneys, trays and designs of openings and nozzles from the feed flow path devices not described herein that do not depart from the scope of the present invention.

The invention claimed is:

1. A contacting column section comprising a feed distribution device comprising;
   a feed line inlet for introducing a feed which is at least partially liquid to the feed distribution device,
   a chamber between the feed line inlet and the column, said chamber having a cross-sectional area,
   a means for causing the flow to be in choked condition and to simultaneously at least partially vaporize before entering the interior portion of the section of the column, and
   wherein the chamber at least partially surrounds a portion of the outer wall of the contacting column.

2. A contacting column section according to claim 1, wherein said choking means is a partition within the chamber at a point between the feed line inlet and the interior portion of the section of the column, said partition having one or more openings, each of said openings having an opening area selected to cause the feed flow through the opening to be in choked condition and to simultaneously at least partially vaporize.

3. A contacting column section according to claim 2, wherein the partition is a portion of the outer wall of the contacting column section.

4. A contacting column section according to claim 1, wherein said choking means is a device which causes increased pressure to the feed by the hydraulic head of liquid or by the hydraulic head of liquid and vapor mixture.

5. A contacting column section according to claim 4, wherein the device is a pipe fitting which causes the feed line inlet to be at a lower level than the end of the chamber attached to the column.

6. A contacting column section according to claim 1, wherein the cross-sectional area of the chamber is greater than that of the feed inlet.

7. A contacting column section according to claim 1, wherein the chamber completely surrounds the circumference of the contacting column section and wherein said choking means is a plurality of openings arranged between the chamber and the interior portion of the contacting column, each of said openings having an opening area selected to cause the feed flow through the opening to be in choked condition and to simultaneously at least partially vaporize.

8. A contacting column section according to claim 1, wherein there is a separation section above, below or above and below the contacting column section and the separation section is for separation, distillation, heat transfer, extraction, wash operation or absorption.

9. A contacting column section according to claim 1, wherein the feed distribution device is located outside of an interior of the contacting column section.

10. A contacting column section according to claim 9, wherein the feed distribution device is affixed to an outer wall of the contacting column section which defines an interior portion of the contacting column section.

11. A contacting column section according to claim 1, further comprising at least one additional feed distribution device.

12. A contacting column section according to claim 1, wherein the chamber has an increasing cross-sectional area from the feed line inlet to the column.

13. A feed distribution device for a contacting column comprising;
- a chamber located between a feed line inlet and a contacting column, said chamber having a cross-sectional area,
- a means for causing the flow from the feed line inlet to be in choked condition and to simultaneously at least partially vaporize before entering the interior portion of the section of the column, and
- a means for affixing the feed distribution device to an exterior portion of the contacting column
- wherein the chamber at least partially surrounds a portion of the outer wall of the contacting column.

14. A feed distribution device according to claim 13, wherein said choking means is a partition within the chamber at a point between the feed line inlet and the interior portion of the section of the column, said partition having one or more openings, each of said openings having an opening area selected to cause the feed flow through the opening to be in choked condition and to simultaneously at least partially vaporize.

15. A feed distribution device according to claim 14, wherein the partition is a portion of the outer wall of the contacting column section.

16. A feed distribution device according to claim 13, wherein said choking means is a device which causes increased pressure to the feed by the hydraulic head of liquid or by the hydraulic head of liquid and vapor mixture.

17. A feed distribution device according to claim 16, wherein the device is a pipe fitting which causes the feed line inlet to be at a lower level than the end of the chamber attached to the column.

18. A feed distribution device according to claim 13, wherein the chamber has an increasing cross-sectional area from the feed line inlet to the column.

* * * * *